(12) United States Patent
Seng et al.

(10) Patent No.: US 6,583,942 B2
(45) Date of Patent: Jun. 24, 2003

(54) METHOD AND APPARATUS FOR DETERMINING EQUALIZED SIGNAL-TO-NOISE RATIO IN A STORAGE DEVICE

(75) Inventors: Edmun ChianSong Seng, Singapore (SG); UttHeng Kan, Singapore (SG); AikChuan Lim, Singapore (SG); KayHee Tang, Singapore (SG)

(73) Assignee: Seagate Technology LLC, Scotts Valley, MN (US)

( * ) Notice: Subject to any disclaimer, the term of this patent is extended or adjusted under 35 U.S.C. 154(b) by 0 days.

(21) Appl. No.: 09/964,302

(22) Filed: Sep. 26, 2001

(65) Prior Publication Data

US 2002/0054443 A1 May 9, 2002

Related U.S. Application Data

(60) Provisional application No. 60/235,604, filed on Sep. 27, 2000.

(51) Int. Cl.[7] ............................................... G11B 27/36
(52) U.S. Cl. .............................. 360/31; 360/32; 360/46; 360/65
(58) Field of Search ............................... 360/31, 32, 46, 360/53, 55, 65; 324/210, 212, 226

(56) References Cited

U.S. PATENT DOCUMENTS 4,625,238 A 11/1986 Penney

OTHER PUBLICATIONS

Nan–Hsiung Yeh et al., "Optimal Head Design and Characterization from a Media Perspective," IEEE Trans. Magn., vol. 35, Iss. 2, Part 1, pp. 776–781 (Mar. 1999).

*Primary Examiner*—Alan T. Faber
(74) *Attorney, Agent, or Firm*—Theodore M. Magee; Westman, Champlin & Kelly, P.A.

(57) ABSTRACT

A method and data storage device determine an equalized signal-to-noise ratio in the storage device. The equalized signal-to-noise ratio is determined by generating an analog read signal, passing the read signal through an equalizer in the storage device, and sampling the equalized signal using an analog-to-digital converter in the storage device. The samples from the analog-to-digital converter are then used in the equalized signal-to-noise calculation.

18 Claims, 4 Drawing Sheets

METHOD AND APPARATUS FOR DETERMINING EQUALIZED SIGNAL-TO-NOISE RATIO IN A STORAGE DEVICE

CROSS-REFERENCE TO RELATED APPLICATION

This application claims priority from a U.S. Provisional Application having Ser. No. 60/235,604, filed on Sep. 27, 2000, and entitled DIGITAL EXTRACTION METHOD OF TIME DOMAIN EQUALIZED SIGNAL TO NOISE RATIO (ESNR).

FIELD OF THE INVENTION

The present invention relates to read channels in storage devices. In particular, the present invention relates to determining a signal-to-noise ratio for a read signal in a storage device.

BACKGROUND OF THE INVENTION

In data storage devices, data that has been written to a storage medium is read from the medium through a read channel. Specifically, a read signal is generated by a read head that passes over the medium. The read signal is provided to the read channel where it is equalized to have a desired shape and is sampled by an analog-to-digital converter. The digital samples are then provided to a detector, such as a Viterbi detector, which determines a most likely sequence of values that could be represented by the digital samples.

One measure of the performance of a drive is the signal-to-noise ratio at the input to the Viterbi detector. Since this ratio involves an equalized read signal, it is referred to as an Equalized Signal-To-Noise Ratio (ESNR).

In the past, determining the ESNR for a drive required a Digital Storage Oscilloscope to over-sample the analog signal from the head and a software program to equalize the analog signal based on a model of the nominal equalization provided by the read channel. The resulting signal provided by the software program was then re-sampled to provide samples that could be used in the equalized signal-to-noise calculation. The use of such external devices was costly, time consuming and not completely accurate.

The present invention provides a solution to this and other problems, and offers other advantages over the prior art.

SUMMARY OF THE INVENTION

A method and data storage device determine an equalized signal-to-noise ratio in the storage device. The equalized signal-to-noise ratio is determined by generating an analog read signal, passing the read signal through an equalizer in the storage device, and sampling the equalized signal using an analog-to-digital converter in the storage device. The samples from the analog-to-digital converter are then used in the equalized signal-to-noise calculation.

DETAILED DESCRIPTION OF ILLUSTRATIVE EMBODIMENTS

Figure 1:
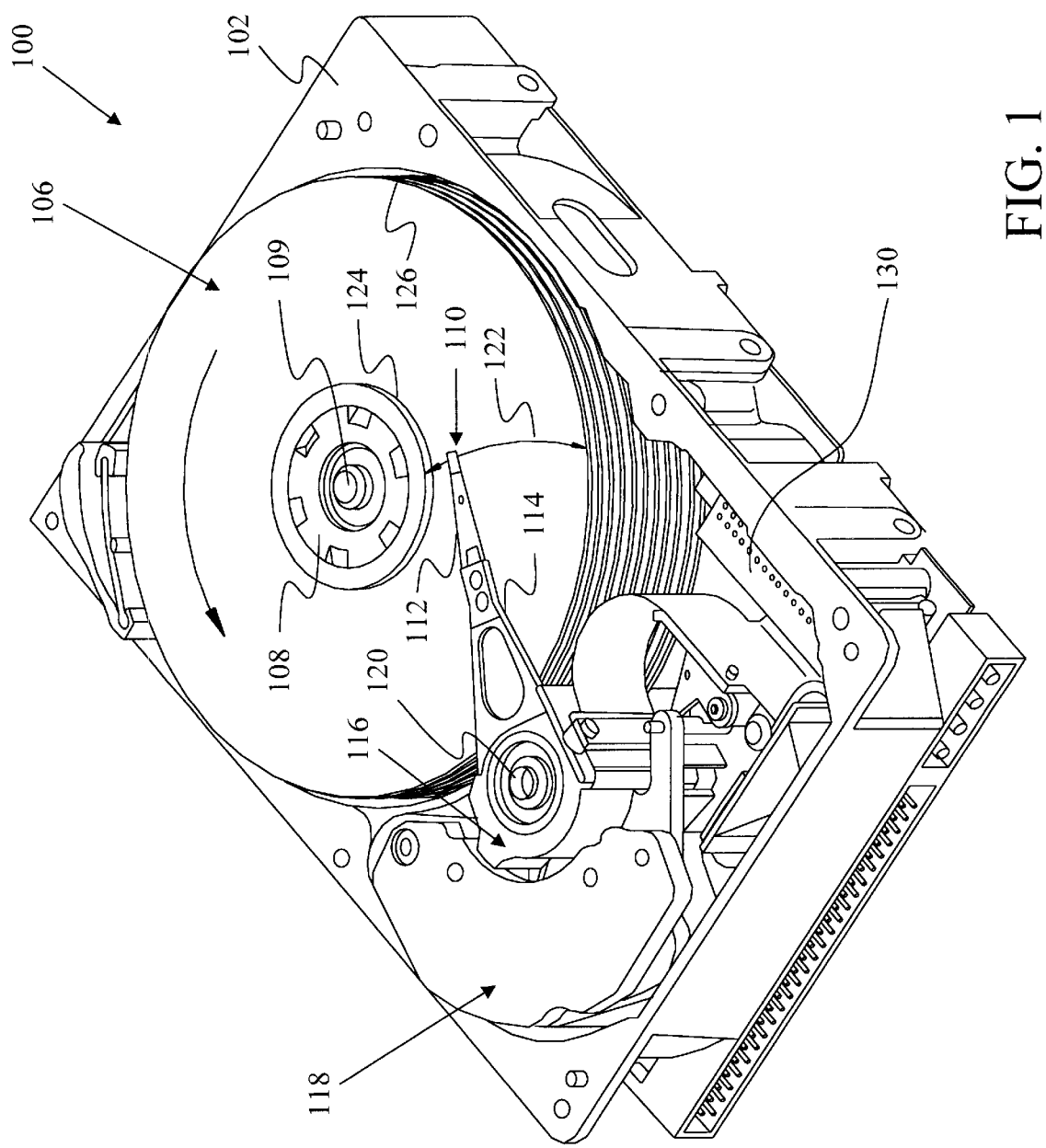
FIG. 1 is a perspective view of disc drive in which aspects of the present invention may be practiced.

FIG. 1 is a perspective view of a disc drive 100 in which the present invention is useful. Disc drive 100 includes a housing with a base 102 and a top cover (not shown). Disc drive 100 further includes a disc pack 106, which is mounted on a spindle motor (not shown), by a disc clamp 108. Disc pack 106 includes a plurality of individual discs, which are mounted for co-rotation about central axis 109. Each disc surface has an associated disc head slider 110 which is mounted to disc drive 100 for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor 118 is driven by servo electronics 130 based on signals generated by heads 110 and a host computer (not shown).

Figure 2:
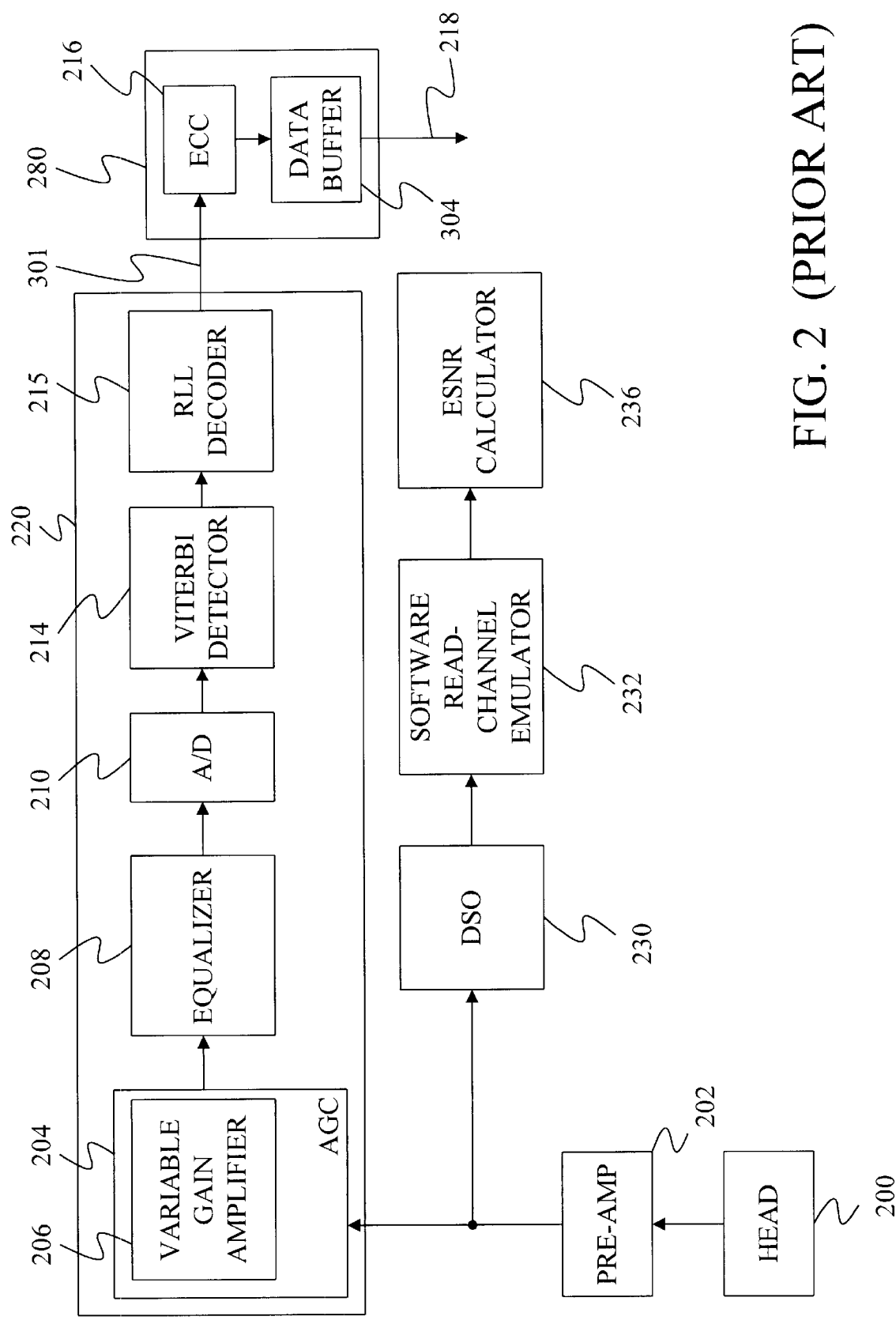
FIG. 2 is a block diagram of a system of the prior art for determining an equalized signal-to-noise ratio for a storage device.

FIG. 2 is a block diagram of components of the prior art used in reading information from a medium and used in determining an equalized signal-to-noise ratio for a storage device. In FIG. 2, a read head 200 generates an electrical read signal by transducing a magnetic field or optical response from the medium. The electrical signal generated by read head 200 is provided to a preamplifier 202, which amplifies the signal. The amplified signal is applied to a read channel 220, which begins with an automatic gain control 204 that uses an internal feedback loop (not shown) to adjust a variable gain amplifier 206. Typically, the automatic gain control 204 has a relatively slow response time so that it ignores changes in the amplitude of the read signal that occur over only small periods of time.

The amplified signal from variable gain amplifier 206 is provided to an equalizer 208, which performs one or more equalization operations on the read signal. The equalization functions performed by equalizer 208 shape the read signal so that it better matches an expected channel response signal. For example, equalizer 208 can shape the response to match a channel target known as EPR4 or a channel target known as E$^2$PR4.

The equalized read signal provided by equalizer 208 is sampled and converted into a digital signal by an analog-to-digital converter 210. The sample values are then provided to a Viterbi detector 214, which uses the digital samples to identify a most likely sequence of data values represented by those samples. This most likely sequence of data values is provided to a Run-Length Limited (RLL) decoder 215, which decodes the data.

The decoded data passes from read channel 220 along NRZ bus 301 to a drive controller 280, which controls and manages disc drive operations. In particular the decoded data is provided to an error correction code module 216, which performs error correction code detection and correction. If error correction code module 216 does not detect any errors or if it is able to correct all the errors it detects, it outputs a sequence of data values to a data buffer 304. The values stored in data buffer 304 are later accessed through an output line 218.

FIG. 2 also shows components used under the prior art to estimate the equalized signal-to-noise ratio of the signal provided to Viterbi detector 214. The system for determining the signal-to-noise ratio includes a digital storage oscilloscope (DSO) 230, which is connected to the output of preamp 202 and receives the analog signal generated by preamp 202. Digital storage oscilloscope (DSO) oversamples the analog signal from preamp 202 to generate a large number of digital samples. DSO 230 is not part of the storage device, but instead is an external piece of hardware that must be connected to an output line from preamp 202.

The samples generated by digital storage oscilloscope 230 are provided to a software read channel 232, which emulates the portions of the read channel between the preamp and Viterbi detector 214. In particular, software read channel 232 emulates the equalization functions of equalizer 208 and the sampling function of analog-to-digital converter 210. Thus, software read channel 232 provides digital samples at the same rate that analog-to-digital converter 210 would provide them. Although software read channel 232 is programmed as best as possible to emulate the read channel, there are always differences between the equalization provided by software read channel 232 and the actual equalization achieved in a read channel.

The data samples provided by software read channel 232 are input to an equalized signal-to-noise ratio calculator 236, which performs a series of calculations on the samples to determine the equalized signal-to-noise ratio.

The prior art system of FIG. 2 is less than ideal for several reasons. First, it requires an external digital storage oscilloscope, which must be connected to the disc drive during testing. This renders the prior art technique unsuitable for testing a large quantity of disc drives since it requires too much time. In addition, as noted above, software read channel 232 provides only an approximation of the effects of equalizing the read signal. In particular, the software read channel does not equalize or sample its signals in exactly the same manner as the read channel.

Figure 3:
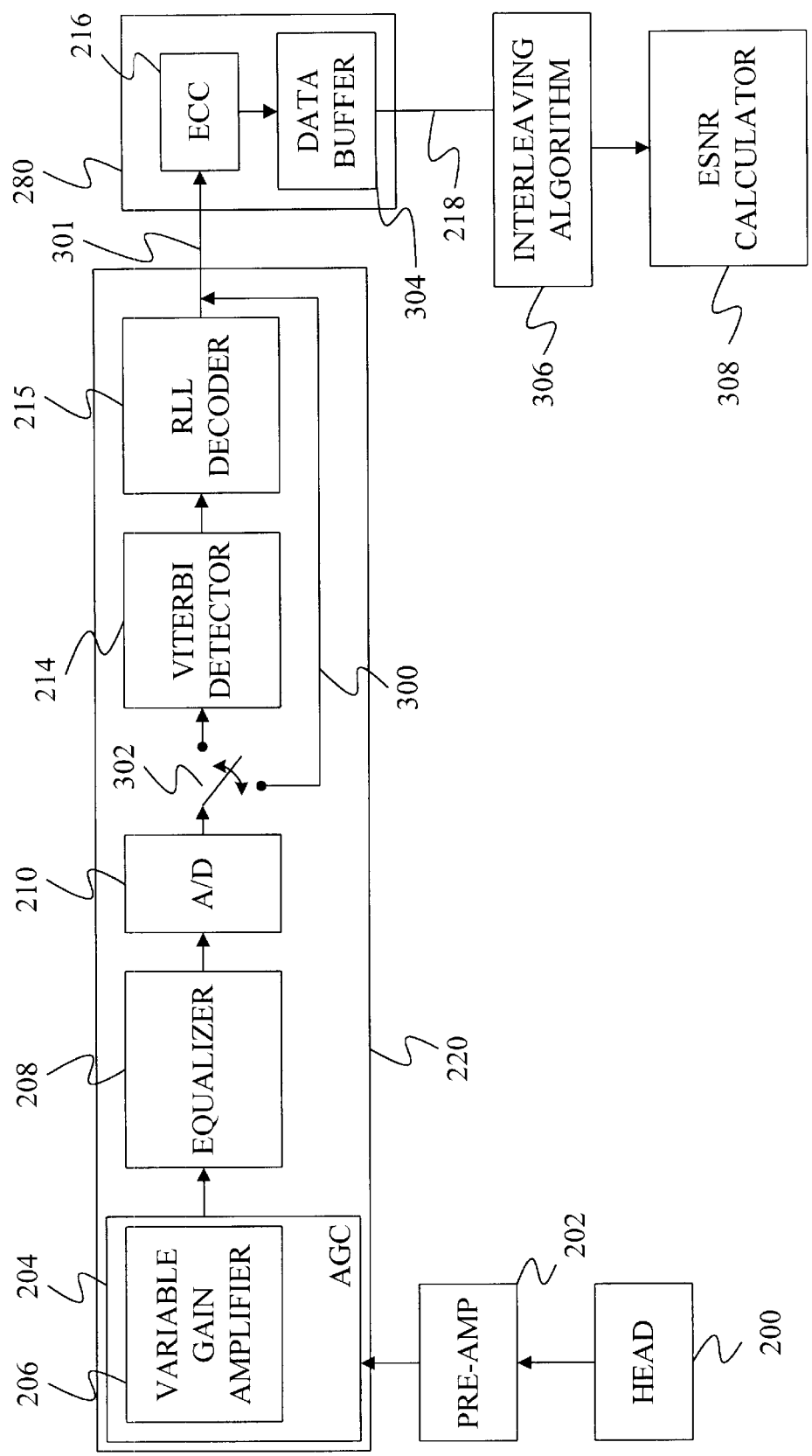
FIG. 3 is a block diagram of a system of an embodiment of the present invention for determining an equalized signal-to-noise ratio for a storage device.

FIG. 3 provides a block diagram of components used in the present invention to read data from a medium and components used to determine an equalized signal-to-noise ratio. In FIG. 3, elements that are common to FIG. 2 are similarly numbered. Thus, the components used to read the data are the same in FIG. 3 as in FIG. 2.

Although the components used to read the data remain the same in the present invention, embodiments of the present invention provide a new means for determining the equalized signal-to-noise ratio. In particular, embodiments of the present invention utilize the storage device's own read channel to equalize and sample the data used in the equalized signal-to-noise calculation, instead of using an external digital storage oscilloscope and software read channel to generate the data.

This can be seen in FIG. 3 where the data used for the equalized signal-to-noise ratio calculation is taken from the output of analog-to-digital converter 210 of read channel 220. In particular, the samples provided by analog-to-digital converter 210 are redirected along bypass 300 to an NRZ bus 301 by redirection component 302 (also referred to as a selector). The samples on NRZ bus 301 pass through ECC block 216, which is deactivated during testing, and are stored in data buffer 304.

Note that many read channels of the prior art have the ability to redirect digital samples from analog-to-digital converter 210 to NRZ bus 300. However, due to the high-speed nature of analog-to-digital converter 210 as compared to the NRZ bus, only one sample in eight can be placed on NRZ bus 301. In some read channels of the prior art, it is possible to control redirection unit 302 to select the phase of the samples that are placed on NRZ bus 301. For example, the first sample in every eight samples would be one selection phase and the second sample in every eight samples would be a second selection phase.

In order to perform equalized signal-to-noise ratio calculations under the present invention, more than one in eight samples of the equalized signal are needed. In particular, all of the samples generated by analog-to-digital converter 210 need to be stored in data buffer 304. To accomplish this, the present invention rereads each data sector eight times, while changing the selection phase of the samples retrieved from the data sector with each read.

Figure 4:
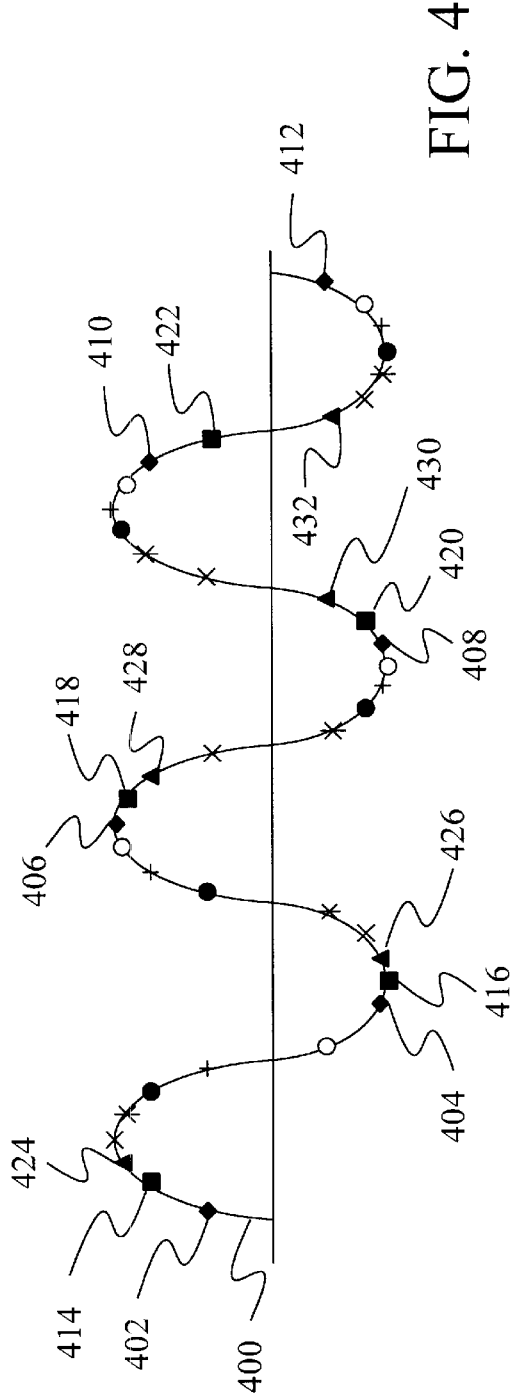
FIG. 4 is a graph of an equalized read signal and the location of samples taken from the signal using different selection phases under an embodiment of the present invention.

The effects of this repetitive sampling can be seen in FIG. 4 where a data read signal 400 is shown together with a collection of sampling points. Read signal 400 represents the read signal that is read during each of the eight passes over the data sector. Although the read signal will vary slightly with each read, for the purposes of the present invention, the eight separate read signals can be considered a single read signal that is repetitively sampled.

During the first pass over the data sector, read signal 400 is sampled at a phase zero represented by sampling points 402, 404, 406, 408, 410 and 412, which are each indicated by diamonds. During the second pass over the data sector, read signal 400 is sampled at a second phase, which is associated with sample points 414, 416, 418, 420 and 422. These sampling points are represented by solid squares in FIG. 4.

During the third pass over the data sector, the selection phase is again changed. The samples associated with this phase are shown in FIG. 4 as samples 424, 426, 428, 430 and 432, indicated by solid triangles in FIG. 4.

The sampling phase continues to be changed with each pass over the data sector. The fourth pass produces data samples shown by an x in FIG. 4, the fifth pass provides data samples shown by a star, the sixth pass provides data samples shown by solid circles, the seventh pass provides data samples shown by a +, and the eighth pass provides data samples shown by open circles.

Because the data samples are collected with sequential passes over the data sector, the data samples found in data buffer 304 are not in the order that they would appear if all of the samples generated by analog-to-digital converter 210 for a single pass over the data sector were placed directly in data buffer 304. In particular, they are grouped in data buffer 304 according to their sampling phase.

Figure 5:
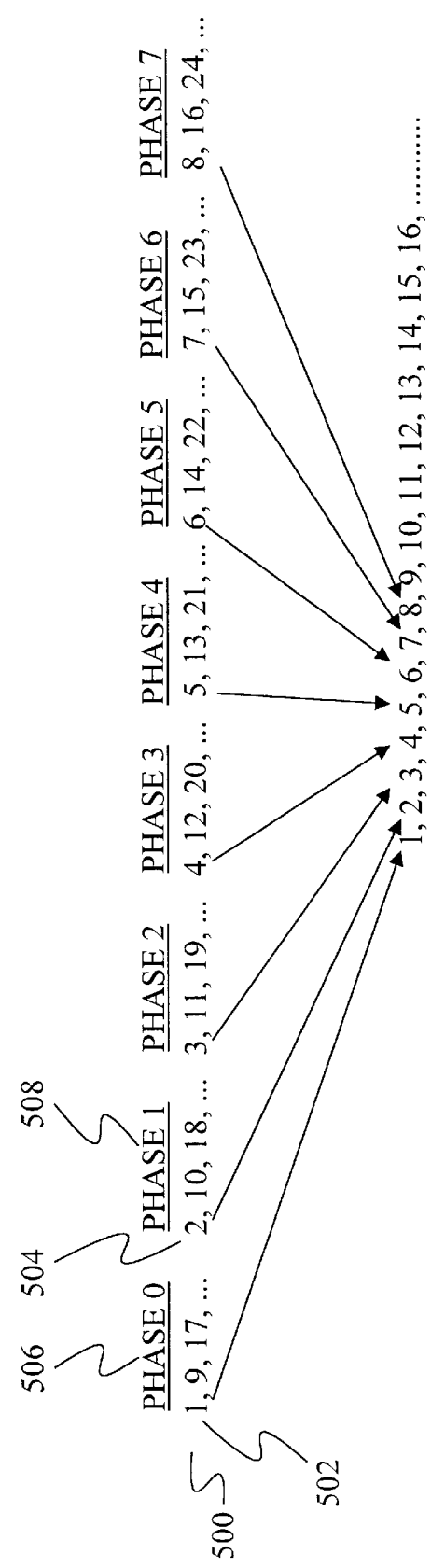
FIG. 5 shows the results of interleaving the samples found in the data buffer.

This can be seen in FIG. 5, where the contents of data buffer 304 are shown in line 500, with each sample being referred to by a position it would have had if the sample had been taken from analog-to-digital converter 210 from a single pass over the data sector. For example, entry 502 has a value of 1 indicating that it would have been the first sample taken from analog-to-digital converter 210 while entry 504 has a value of 2 indicating that it would have been the second sample taken from analog-to-digital converter 210. For example, sample 502 would correspond to sample 402 in FIG. 4 while 504 would correspond to sample 414 in FIG. 4.

In FIG. 5, the samples are grouped based on their sample phase. For example, all of the samples grouped under PHASE 0 (506) would have been stored in data buffer 304 during a first pass over the servo sector, while all of the samples under PHASE 1 (508) would have been collected during a second pass over the data sector.

In order to use the data samples found in data buffer 304, the samples must be reorganized, or interleaved, so that they are in the order they would have been if the data samples had been collected directly from analog-to-digital converter 210 in a single read. This interleaving produces a sequence of samples 506 as shown in FIG. 5 and is performed by an interleaving algorithm 306 of FIG. 3.

Note that the ratio of the data rate of the analog-to-digital converter to the data rate on NRZ bus 301 is not limited to 8-to-1 and that other ratios may be used with the present invention.

Once the samples have been reordered by interleaving algorithm 306, they are provided to an equalized signal-to-noise ratio calculator 308 which calculates the equalized signal-to-noise ratio based on the data samples. In some embodiments, using a Pseudo Random Binary Sequence (PRBS or PRS) that contains M repeating cycles of a bit pattern having N bits, equalized signal-to-noise ratio calculator 308 performs the following calculations:
Assuming $$V = \sum_{m=1}^{M} \sum_{n=1}^{N} a_{mn} \text{ and } \varepsilon_{mn} = a_{mn} - \overline{a_{mn}},$$

where $\varepsilon_{mn}$=sampling error;
$\alpha_{mn}$=ADC sample output; and
$\overline{\alpha_{mn}}$=Ideal Target Sample
Then $$\sigma_{MSE}^2 = \frac{1}{MN} \sum_{m=1}^{M} \sum_{n=1}^{N} \left[ \varepsilon_{mn}^2 - \left( \frac{1}{MN} \sum_{m=1}^{M} \sum_{n=1}^{N} \varepsilon_{mn} \right)^2 \right]$$

where

M=the m-th cycle of the PRS; and
N=the n-th bit of the PRS
Breaking down into noise and non-linear distortion (NLD):

$$\sigma_{MSE}^2 = \sigma_{Noise}^2 + \sigma_{NLD}^2,$$

with $$\sigma_{Noise}^2 = \frac{1}{N} \sum_{n=1}^{N} \left( \frac{1}{M} \sum_{m=1}^{M} \varepsilon_{mn}^2 - \left( \frac{1}{M} \sum_{m=1}^{M} \varepsilon_{mn} \right)^2 \right),$$

$$\sigma_{NLD}^2 = \frac{1}{N} \sum_{n=1}^{N} \left( \frac{1}{M} \sum_{m=1}^{M} \varepsilon_{mn} \right)^2 - \left( \frac{1}{N} \sum_{n=1}^{N} \left( \frac{1}{M} \sum_{m=1}^{M} \varepsilon_{mn} \right) \right)^2$$

The equalized signal-to-noise ratio (ESNR) is then calculated as:

$$ESNR = 20 * \log \frac{S_{EPR4sample}}{Noise_{PRSrms}}$$

$$= 20 * \log \frac{S_{PRSrms}}{Noise_{PRSrms}} + 10 * \log \frac{N}{N+1}$$

$$\frac{S_{EPR4sample}}{S_{PRSrms}} = \sqrt{\frac{N}{N+1}},$$

where N=PRS Length $S_{PRSrms}$=Signal$EPR4$ $$ESNR_{rmse} = 20 * \log \left( \frac{SignalEPR4^2}{SigmaRMSE^2} \right)$$

$$ESNR_{noise} = 20 * \log \left( \frac{SignalEPR4^2}{SigmaNoise^2} \right)$$

$$ESDR_{tdist} = 20 * \log \left( \frac{SignalEPR4^2}{SigmaNLD^2} \right)$$

where ESDR=Equalized Signal to Distortion Ratio. The exact formulas used to calculate the ESNR are not critical to the present invention.

Note that under some embodiments of the present invention, interleaving algorithm 306 and ESNR calculator 308 are embodied in a processing unit in the storage device. In other embodiments, ESNR calculator 308 or both ESNR calculator and interleaving algorithm 306 are external to the storage device. In particular, these functions can be performed by the host computer.

In summary, a method is provided for determining a signal-to-noise ratio in a storage device 100. The method includes generating an analog read signal, passing the read signal through an equalizer 208 in the storage device, and sampling the equalized signal using an analog-to-digital converter 210 in the storage device. The samples from the analog-to-digital converter 210 are then used in the signal-to-noise calculation.

In addition, a data storage device 100 is provided that reads data from a medium 106. The data storage device 100 includes a head 200 for generating an analog signal based on data stored on medium 106. The analog signal is equalized by an equalizer 208 to form an equalized signal that is sampled by an analog-to-digital converter 210. A selector 302 selects a sample from the plurality of samples produced by analog-to-digital converter 210 and provides the selected sample to a data buffer 304. A signal-to-noise ratio calculator then uses the samples in data buffer 304 to calculate the signal-to-noise ratio.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the read channel and the signal-to-noise calculation while maintaining substantially the same functionality without departing from the scope and spirit of the present invention. In addition, although the preferred embodiment described herein is directed to a read channel for a disc drive system, it will be appreciated by those skilled in the art that the teachings of the present invention can be applied to other systems, like communication systems or other storage systems, without departing from the scope and spirit of the present invention.

What is claimed is:

1. A method of determining an equalized signal-to-noise ratio in a storage device, the method comprising steps of:

(a) generating an analog read signal;
    (b) passing the analog signal through an equalizer in the storage device to produce an equalized signal;
    (c) sampling the equalized signal using an analog to digital converter in the storage device to produce equalized samples; and
    (d) calculating the equalized signal-to-noise ratio based on the equalized samples.

2. The method of claim 1 wherein sampling step (c) comprises sampling and storing the samples.

3. The method of claim 2 wherein sampling step (c) further comprises sampling at a rate that is higher than the rate at which the samples may be stored.

4. The method of claim 3 wherein storing the samples comprises setting a selection phase so as to select to store one sample from every n samples.

5. The method of claim 4 wherein n is equal to eight.

6. The method of claim 4 wherein generating step (a) comprises generating an analog signal by repetitively reading a same sector on a data storage medium in the storage device.

7. The method of claim 6 wherein setting a selection phase comprises setting a different selection phase for each portion of the analog signal that is associated with a different occurrence of reading the same sector.

8. The method of claim 7 wherein storing the samples further comprises reordering the samples to form a set of reordered samples.

9. The method of claim 8 wherein calculating step (d) comprises calculating the equalized signal-to-noise ratio based on the reordered samples.

10. A data storage device for reading data from a medium, the data storage device comprising:

a head for generating an analog signal based on data stored on a medium;
    an equalizer that equalizes the analog signal to form an equalized signal;
    an analog-to-digital converter that samples the equalized signal to generate plurality of samples;
    a selector that selects a sample from the plurality of samples and provides the selected sample to a data buffer; and
    an equalized signal-to-noise ratio calculator that calculates an equalized signal-to-noise ratio based on the samples in the data buffer.

11. The data storage device of claim 10 wherein the analog-to-digital converter generates samples at a higher rate than samples can be stored in the data buffer.

12. The data storage device of claim 11 further comprising an interleaving unit that reorders the samples selected by the selector to provide reordered samples.

13. The data storage device of claim 12 wherein the equalized signal-to-noise ratio calculator calculates the equalized signal-to-noise ratio from the reordered samples.

14. A data storage device for retrieving data from a recording medium, the data storage device comprising:

a read head and read channel for generating equalized data samples from data stored on the recording medium; and
    equalized signal-to-noise ratio calculating means coupled to the read channel for determining an equalized signal-to-noise ratio from the equalized data samples.

15. The data storage device of claim 14 wherein the equalized signal-to-noise calculating means comprises a selector that selects equalized data samples and a data buffer that stores equalized data samples that are selected by the selector.

16. The data storage device of claim 15 wherein the read channel generates equalized data samples at a higher rate than equalized data samples can be stored in the data buffer.

17. The data storage device of claim 16 wherein the equalized signal-to-noise calculating means further comprises an interleaving unit that reorders samples in the data buffer to produce reordered samples.

18. The data storage device of claim 17 wherein the equalized signal-to-noise ratio is calculated from the reordered samples.

* * * * *

UNITED STATES PATENT AND TRADEMARK OFFICE
CERTIFICATE OF CORRECTION

PATENT NO. : 6,583,942 B2
DATED : June 24, 2003
INVENTOR(S) : Seng et al.

It is certified that error appears in the above-identified patent and that said Letters Patent is hereby corrected as shown below:

Title page,
Item [73], Assignee, delete "Scotts Valley, MN (US)" and replace with -- Scotts Valley, CA (US) --

Signed and Sealed this

Eighteenth Day of May, 2004

JON W. DUDAS
*Acting Director of the United States Patent and Trademark Office*